(12) United States Patent
Virkler

(10) Patent No.: US 10,316,665 B2
(45) Date of Patent: Jun. 11, 2019

(54) FULL RING CURVIC SEAL

(71) Applicant: United Technologies Corporation, Hartford, CT (US)

(72) Inventor: Scott D. Virkler, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 860 days.

(21) Appl. No.: 14/772,849

(22) PCT Filed: Mar. 10, 2014

(86) PCT No.: PCT/US2014/022352
§ 371 (c)(1),
(2) Date: Sep. 4, 2015

(87) PCT Pub. No.: WO2014/197024
PCT Pub. Date: Dec. 11, 2014

(65) Prior Publication Data
US 2016/0010458 A1   Jan. 14, 2016

Related U.S. Application Data

(60) Provisional application No. 61/775,934, filed on Mar. 11, 2013.

(51) Int. Cl.
*F01D 5/02* (2006.01)
*F01D 11/00* (2006.01)
(Continued)

(52) U.S. Cl.
CPC .............. *F01D 5/026* (2013.01); *F01D 5/02* (2013.01); *F01D 11/003* (2013.01);
(Continued)

(58) Field of Classification Search
CPC ........ F01D 11/003; F01D 11/005; F01D 5/02; F01D 5/026; F05D 2220/32;
(Continued)

(56) References Cited

U.S. PATENT DOCUMENTS 4,061,366 A   12/1977   Affa
4,708,371 A   11/1987   Elsworth et al.
(Continued)

FOREIGN PATENT DOCUMENTS

| EP | 0032824 A1 | 7/1981 |
|---|---|---|
| FR | 1235589 A | 7/1960 |
| WO | 92/05376 A1 | 4/1992 |

OTHER PUBLICATIONS

International Preliminary Report on Patentability for International Application No. PCT/US2013/072719 dated Sep. 24, 2015.
(Continued)

*Primary Examiner* — Mark A Laurenzi
*Assistant Examiner* — Paul W Thiede
(74) *Attorney, Agent, or Firm* — Carlson, Gaskey & Olds, P.C.

(57) ABSTRACT

A shaft coupling between a first shaft and a second shaft includes a seal assembly to minimize leakage. The seal assembly includes a ring press fit against an inner surface of the first shaft and a clearance fit with an inner surface of the second shaft. A seal is supported between the ring and the inner surface of the second shaft.

17 Claims, 3 Drawing Sheets

(51) Int. Cl.
*F16J 15/06* (2006.01)
*F16D 1/02* (2006.01)

(52) U.S. Cl.
CPC .............. *F01D 11/005* (2013.01); *F16D 1/02* (2013.01); *F16J 15/062* (2013.01); *F05D 2220/32* (2013.01); *F05D 2230/60* (2013.01); *F05D 2240/60* (2013.01); *F05D 2260/37* (2013.01)

(58) Field of Classification Search
CPC ............ F05D 2230/60; F05D 2240/60; F05D 2260/37; F16D 1/02; F16J 15/062
USPC ................................ 416/120; 285/13; 60/739
See application file for complete search history.

(56) References Cited

U.S. PATENT DOCUMENTS

| | | | |
|---|---|---|---|
| 5,628,621 A | 5/1997 | Toborg | |
| 6,273,474 B1 | 8/2001 | DeLange et al. | |
| 6,568,692 B2 | 5/2003 | Kolodziej et al. | |
| 6,672,966 B2 | 1/2004 | Muju et al. | |
| 7,309,210 B2 | 12/2007 | Suciu et al. | |
| 7,448,221 B2 | 11/2008 | Suciu et al. | |
| 8,215,919 B2 | 7/2012 | Jewess et al. | |
| 2004/0245778 A1 | 12/2004 | Adams | |
| 2006/0213202 A1 | 9/2006 | Fukutani | |
| 2012/0201658 A1 | 8/2012 | Le Brusg et al. | |
| 2017/0191369 A1* | 7/2017 | Partyka | F01D 11/003 |
| 2017/0335702 A1* | 11/2017 | Porter | F01D 11/005 |

OTHER PUBLICATIONS

European Search Report for EP Application No. 14807714.2 dated Sep. 16, 2016.
International Search Report and Written Opinion for International Application No. PCT/US2014/022352 dated Dec. 17, 2014.

* cited by examiner

FULL RING CURVIC SEAL

CROSS REFERENCE TO RELATED APPLICATION

This application claims priority to U.S. Provisional Application No. 61/775,934 filed Mar. 11, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The high and low pressure turbines drive the corresponding high and low pressure compressors through inner and outer shafts. Some shaft configurations include multiple sections joined together utilizing an axial face coupling also referred to as a curvic coupling. A curvic coupling includes axially engaging teeth that provide alignment and power transmission. During operation, one side of each axially tooth is loaded and an opposing side is not loaded and therefore can result in leakage flow through the coupling. Leakage through the coupling is not desirable and therefore a seal may be utilized to prevent or slow leakage. However, such seals may not interfere with the coupling fit and therefore may not be loaded in all operational conditions.

Accordingly, although current seals provide some protection to airflow through the curvic joint, engine manufacturers continue to seek further improvements to engine performance including improvements to thermal, transfer and propulsive efficiencies.

SUMMARY

A shaft coupling according to an exemplary embodiment of this disclosure, among other possible things includes a first shaft, a second shaft coupled to the second shaft, a ring including a first end fit against a first inner surface of the first shaft and a second end including a clearance fit with a second inner surface of the second shaft, and a seal supported between the second end of the ring and the second inner surface.

In a further embodiment of the foregoing shaft coupling, the ring includes a cavity on the second end receiving the seal.

In a further embodiment of any of the foregoing shaft couplings, the cavity includes an angled surface driving the seal toward the second inner surface responsive to radially outward movement of the seal.

In a further embodiment of any of the foregoing shaft couplings, the first inner surface includes a first tab extending radially inward and the second inner surface includes a second tab extending radially inward and the ring is disposed between the first tab and the second tab.

In a further embodiment of any of the foregoing shaft couplings, the ring includes a first axially facing surface that is loaded against the first tab.

In a further embodiment of any of the foregoing shaft couplings, the first shaft and the second shaft are coupled along corresponding first and second axially facing coupling surfaces.

In a further embodiment of any of the foregoing shaft couplings, each of the first and second axially facing surface include curvic teeth.

In a further embodiment of any of the foregoing shaft couplings, the ring includes a wire seal.

A spool assembly for a gas turbine engine according to an exemplary embodiment of this disclosure, among other possible things includes a compressor section supported on a first shaft, a turbine section supported on a second shaft, a curvic coupling between the first shaft and the second shaft for transferring torque, and a seal assembly including a ring fit against a first inner surface of the first shaft and extending axially across the coupling into a clearance fit with a second inner surface of the second shaft and a seal supported between the ring and the second inner surface of the second shaft.

In a further embodiment of the foregoing spool assembly, the ring includes a cavity receiving the seal.

In a further embodiment of any of the foregoing spool assemblies, the cavity includes an angled surface driving the seal toward the second inner surface responsive to radially outward movement of the seal.

In a further embodiment of any of the foregoing spool assemblies, the first inner surface includes a first tab extending radially inward and the second inner surface includes a second tab extending radially inward and the ring is disposed between the first tab and the second tab.

In a further embodiment of any of the foregoing spool assemblies, the ring includes a first axially facing surface that is loaded against the first tab.

A method of coupling first and second shaft sections according to an exemplary embodiment of this disclosure, among other possible things includes pressing a first end of a ring into a first inner surface of a first shaft, attaching a second shaft to the first shaft at an axial interface, fitting a second end of the ring into a second inner surface of the second shaft, and supporting a seal between the second end of the ring and the second inner surface of the inner shaft.

In a further embodiment of the foregoing method, includes pressing the first end of the ring into the first inner surface of the first shaft and providing a clearance fit between the second end of the ring and the second inner surface.

In a further embodiment of any of the foregoing methods, the first inner surface includes a first tab extending radially inward and the second inner surface includes a second tab extending radially inward and the ring is fit between the first tab and the second tab.

In a further embodiment of any of the foregoing methods, the ring includes a cavity facing the second tab and the seal is assembled into the cavity and into sealing engagement between the cavity and the second tab.

In a further embodiment of any of the foregoing methods, the cavity includes a ramped surface that drives the seal against the second tab when moved radially outward.

In a further embodiment of any of the foregoing methods, includes engaging a first set of curvic teeth defined on the first shaft to a second set of curvic teeth on the second shaft to form the axial interface.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
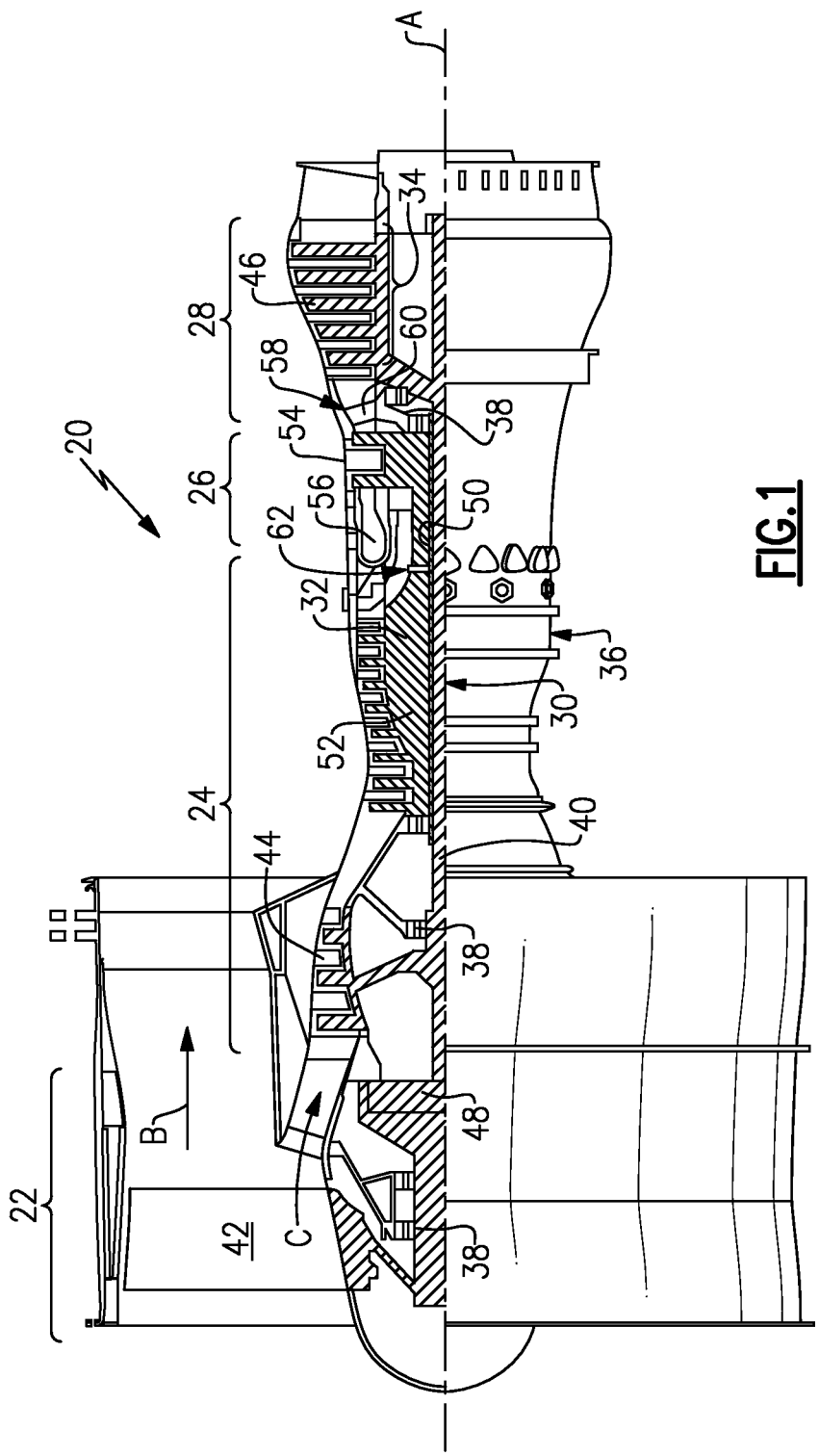
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the airflow through bypass flow path B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second (350 m/sec).

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The low spool 30 includes the inner shaft 40 that interconnects the low pressure turbine 46 and the low pressure compressor 44. The high spool 32 includes the outer shaft 50 that interconnects the high pressure turbine 54 with the high pressure compressor 52. The inner shaft 40 and the outer shaft 50 can be fabricated from several sections that are coupled at an axial interface to ease assembly.

Figure 2:
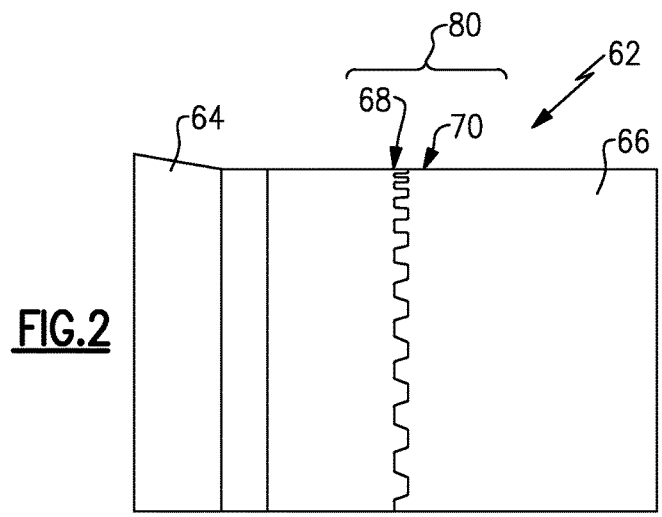
FIG. 2 is a side view of an example curvic coupling.
Figure 3:
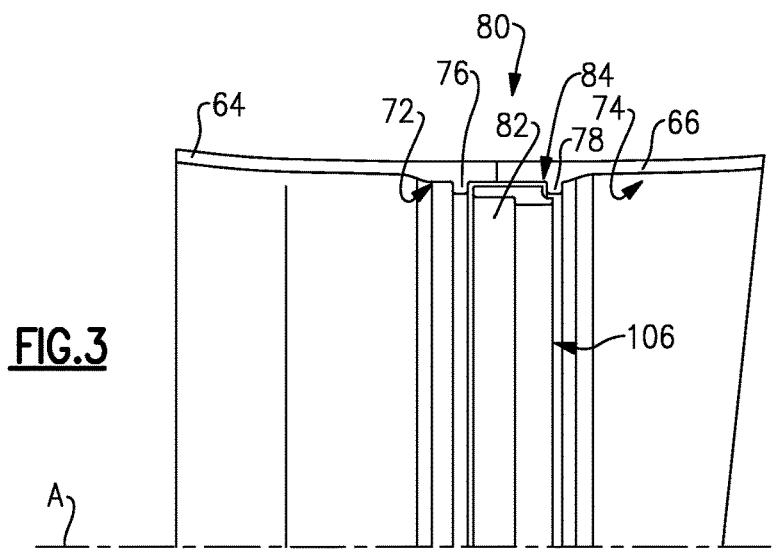
FIG. 3 is an interior sectional view of the example curvic coupling.
Figure 4:
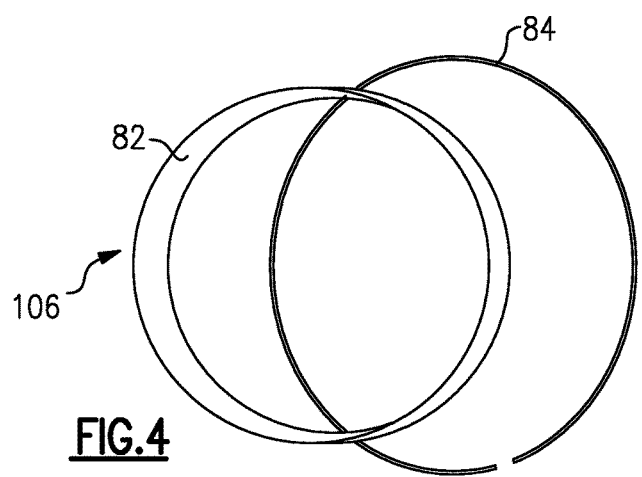
FIG. 4 is a perspective view of an examples seal for the curvic coupling.

Referring to FIGS. 2, 3 and 4 with continued reference to FIG. 1, an example coupling 62 between a first shaft 64 and a second shaft 66 comprises the axial interface 80. In this example the axial interface 80 is a curvic joint that includes a first set of curvic teeth 68 that are in meshed engagement with a second set of curvic teeth 70. The curvic joint transmits torque between the first shaft 64 and the second shaft 66. The specific configuration and shape of the first and second sets of curvic teeth 68, 70 is determined by application specific requirements. One requirement is that airflow or leakage through the axial interface be minimized.

Accordingly, a seal assembly 106 is provided within the first and second shafts 64, 66 to minimize airflow and leakage through the axial interface 80. The seal assembly 106 includes a full hoop ring 82 and a wire seal 84. The ring 82 is pressed into an inner surface 72 of the first shaft 64 and extends over the axial interface 80 into a clearance fit with an inner surface 74 of the second shaft 66. The seal 84 is supported between the ring 82 and the second inner surface 74.

A first tab 76 extends radially inward from the first inner surface 72 and a second tab 78 extends radially inward from the second inner surface 74. The ring 82 is supported between the first and second tabs 76, 78 and the seal 84 seals between the ring 82 and the second tab 78.

Figure 5:
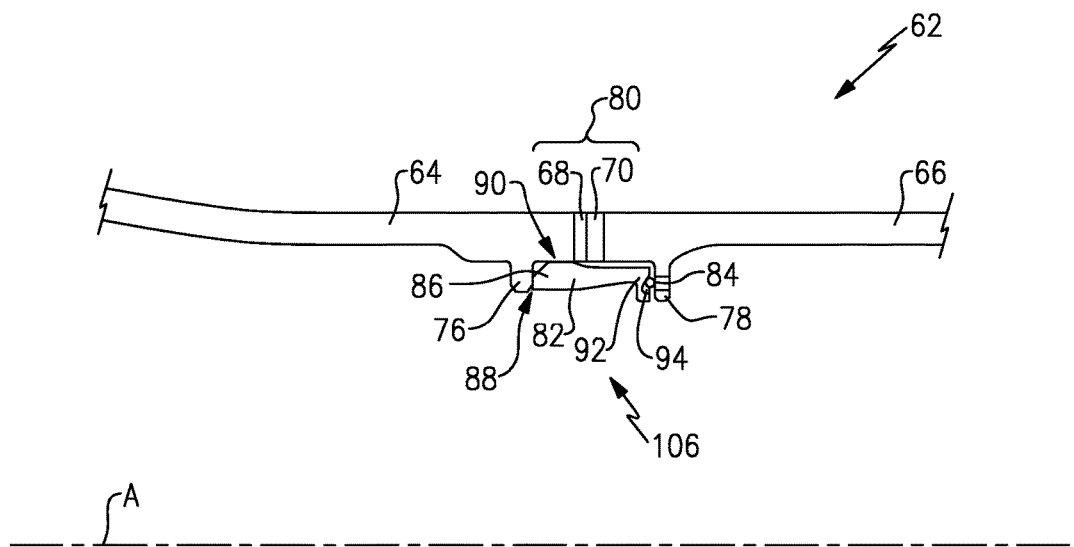
FIG. 5 is a cross-sectional view of the example curvic coupling and seal assembly.
Figure 6:
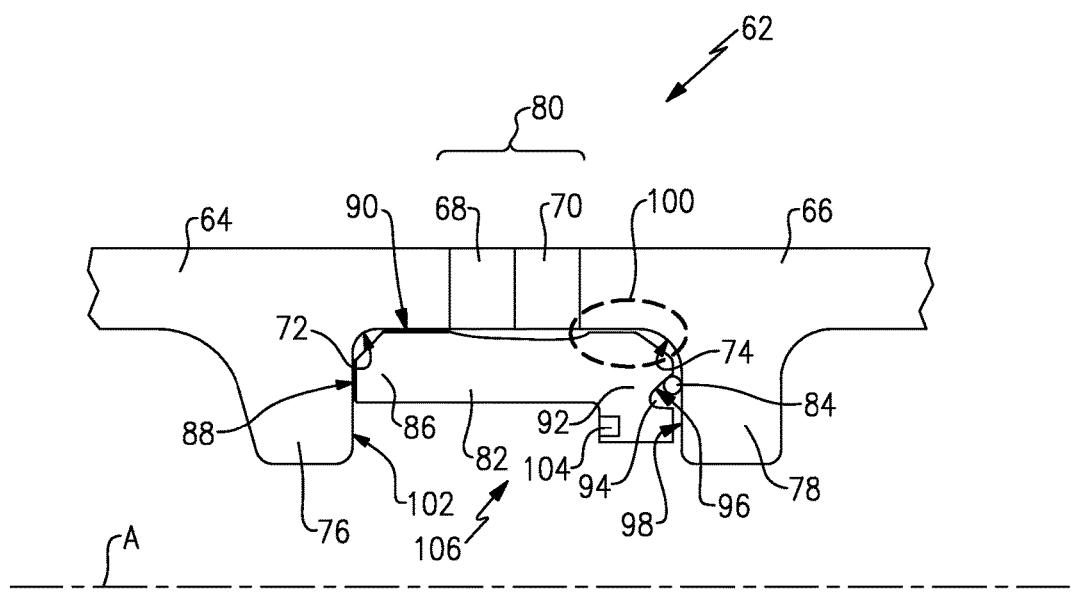
FIG. 6 is an enlarged cross-sectional view of the curvic coupling and seal assembly.

Referring to FIGS. 5 and 6, the ring 82 includes a first end 86 with an axial surface 88 and a radial surface 90. The axial surface 88 and the radial surface 90 are press fit into the first shaft 64 against an axial surface 102 of the first tab 76. The press fit provides a load that maintains sufficient contact force to maintain an air seal between the first shaft 64 and the ring 82.

A pressure differential between an exterior area around the coupling 62 and the interior of the shafts 64, 66 can cause leakage through the axial interface 80. In this example an air or gas pressure outside or the coupling is greater than the low pressure environment within the shafts 64, 66. The seal assembly 106 reduces leakage caused by the pressure differential.

The ring 82 includes a second end 92 that includes a cavity 94 that receives the seal 84. The cavity 94 includes an angled surface 96 that decreases in width in a radially outward direction. The decreasing angled surface 96 drives the seal 84 into contact with an axial surface 98 of the second tab 78. The interface of the seal 84 between the angled surface 96 of the cavity 94 provides the desired sealing.

The second end 92 of the ring 82 is a clearance or loose fit with the second shaft 66 as is generally indicated at 100. The loose fit between the ring 82 and the second shaft 66 prevents the first and second shafts 64, 66 from being fixed together by the ring 82. The clearance fit 100 enables relative movement between the first and second shafts 64, 66 to accommodate thermal growth or other relative movement that may occur during operation. Although a clearance fit is disclosed, a tight fit may be utilized in some installations.

The ring 82 includes a puller groove 104 on the second end 92 to facilitate assembly and removal of the seal assembly 106.

The seal assembly 106 is assembled to the coupling 62 prior to joining of the first and second shafts 64, 66. The ring 82 is first press fit into the inner surface 72 of the first shaft 64. The press fit is provided at the axial surface 88 and the radial surface 90. The press fit provides that a load is maintained between the ring 82 and the inner surface of the first shaft 64.

The first shaft 64 is then attached to the second shaft 66 at the axial interface 80. The first set of curvic teeth 68 are meshed to the second set of curvic teeth 70 to provide the torque transmitting coupling. During assembly, the ring 82 extends over the axial interface 80 toward the second tab 78. The seal 84 supported within the ring 82 is pressed between angled surface 96 and the axial surface 98 to seal against leakage past the second end 92 of the ring 82. The second end 92 includes the clearance 100 with the second tab 78 and second inner surface 74. The seal 84 provides sealing and accommodates relative movement to maintain a seal and prevent airflow and leakage around the seal assembly 106.

Accordingly, the example seal assembly 106 provides for sealing of a shaft coupling without locking shaft parts together. Moreover, the example seal assembly 106 prevents leakage flow through the axial interface 80.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A shaft coupling comprising:
   a first shaft including a first inner surface and a first tab extending radially inward from the first inner surface;
   a second shaft coupled to the first shaft, the second shaft including a second inner surface and as second tab extending radially inward from the second inner surface;
   a ring disposed between the first tab and the second tab, the ring including a first end fit against a first inner surface of the first shaft, a first axially facing surface that is loaded against the first tab and a second end fit to a second inner surface of the second shaft; and
   a seal supported between the second end of the ring and the second inner surface.

2. The shaft coupling as recited in claim 1, wherein the second end is a clearance fit with the second inner surface of the second shaft.

3. The shaft coupling as recited in claim 1, wherein the second end is a tight fit with the second inner surface of the second shaft.

4. The shaft coupling as recited in claim 1, wherein the ring includes a cavity on the second end receiving the seal.

5. The shaft coupling as recited in claim 4, wherein the ring includes an angled surface driving the seal toward the second inner surface responsive to radially outward movement of the seal.

6. The shaft coupling as recited in claim 1, wherein the first shaft and the second shaft are coupled along corresponding first and second axially facing coupling surfaces.

7. The shaft coupling as recited in claim 6, wherein each of the first and second axially facing surface comprise curvic teeth.

8. The shaft coupling as recited in claim 1, wherein the ring comprises a wire seal.

9. A spool assembly for a gas turbine engine comprising:
a compressor section supported on a first shaft;
a turbine section supported on a second shaft;
a curvic coupling between the first shaft and the second shaft for transferring torque; and
a seal assembly including a ring fit against a first inner surface of the first shaft and extending axially across the coupling into a clearance fit with a second inner surface of the second shaft and a seal supported between the ring and the second inner surface of the second shaft.

10. The spool assembly as recited in claim 9, wherein the ring includes a cavity receiving the seal.

11. The spool assembly as recited in claim 10, wherein the cavity includes an angled surface driving the seal toward the second inner surface responsive to radially outward movement of the seal.

12. The spool assembly as recited in claim 9, wherein the first inner surface includes a first tab extending radially inward and the second inner surface includes a second tab extending radially inward and the ring is disposed between the first tab and the second tab.

13. The spool assembly as recited in claim 12, wherein the ring includes a first axially facing surface that is loaded against the first tab.

14. A method of coupling first and second shaft sections comprising:
pressing a first end of a ring into a first inner surface of a first shaft, wherein the first shaft includes a first tab extending radially inward from the first inner surface;
attaching a second shaft to the first shaft at an axial interface;
fitting a second end of the ring into a second inner surface of the second shaft, wherein the second shaft includes a second tab extending radially inward from the second inner surface and the ring is fit between the first tab and the second tab; and
supporting a seal between the second end of the ring and the second inner surface of the second shaft, wherein the ring includes a cavity facing the second tab and the seal is assembled into the cavity and into sealing engagement between the cavity and the second tab.

15. The method as recited in claim 14, including pressing the first end of the ring into the first inner surface of the first shaft and providing a clearance fit between the second end of the ring and the second inner surface.

16. The method as recited in claim 14, wherein the ring includes a ramped surface that drives the seal against the second tab when the seal is moved radially outward relative to the ring.

17. The method as recited in claim 14, including engaging a first set of curvic teeth defined on the first shaft to a second set of curvic teeth on the second shaft to form the axial interface.

* * * * *